United States Patent
Bauer et al.

(10) Patent No.: US 12,235,507 B2
(45) Date of Patent: Feb. 25, 2025

(54) METHOD FOR PRODUCING A CAMERA MODULE, CAMERA MODULE

(71) Applicant: Robert Bosch GmbH, Stuttgart (DE)

(72) Inventors: Nikolai Bauer, Moeglingen (DE); Andreas Moehrle, Stuttgart (DE); Moritz Winkler, Waldbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 319 days.

(21) Appl. No.: 17/639,503

(22) PCT Filed: Oct. 12, 2020

(86) PCT No.: PCT/EP2020/078536
§ 371 (c)(1),
(2) Date: Mar. 1, 2022

(87) PCT Pub. No.: WO2021/078548
PCT Pub. Date: Apr. 29, 2021

(65) Prior Publication Data
US 2022/0342175 A1    Oct. 27, 2022

(30) Foreign Application Priority Data
Oct. 23, 2019  (DE) .................. 10 2019 216 283.5

(51) Int. Cl.
  *G02B 7/00*  (2021.01)
  *G02B 7/02*  (2021.01)
(52) U.S. Cl.
  CPC ............ *G02B 7/003* (2013.01); *G02B 7/022* (2013.01)

(58) Field of Classification Search
  CPC .................... G02B 7/022; G02B 7/003
  (Continued)

(56) References Cited

U.S. PATENT DOCUMENTS 5,589,990 A * 12/1996 Kato .................... G02B 6/4226
  359/811
2006/0028573 A1 * 2/2006 Seo ........................ H04N 23/55
  348/340

(Continued)

FOREIGN PATENT DOCUMENTS

CN    104471476 A    3/2015
CN    106405988 A    2/2017

(Continued)

OTHER PUBLICATIONS

International Search Report for PCT/EP2020/078536, Issued Dec. 9, 2020.

*Primary Examiner* — Wyatt A Stoffa
*Assistant Examiner* — Mitchell T Oestreich
(74) *Attorney, Agent, or Firm* — NORTON ROSE FULBRIGHT US LLP; Gerard A. Messina

(57) ABSTRACT

A method for producing a camera module. An objective is aligned with respect to an image sensor and is then fixed in position by being joined to a support that receives the image sensor, a housing that surrounds the image sensor, or an interposed connection structure as a joining partner. The objective is mounted on spacer elements, which are initially still movable, and is then aligned with respect to the image sensor by moving the spacer elements. After the objective is aligned, the spacer elements are welded to the objective and the joining partner. A camera module is also described.

12 Claims, 9 Drawing Sheets

(58) Field of Classification Search
USPC .......................................................... 359/819
See application file for complete search history.

(56) References Cited

U.S. PATENT DOCUMENTS

| | | |
|---|---|---|
| 2009/0103193 A1 | 4/2009 | Berube |
| 2011/0298968 A1 | 12/2011 | Tseng et al. |
| 2014/0146214 A1 | 5/2014 | Nakajima et al. |
| 2014/0298642 A1 | 10/2014 | Sesti et al. |
| 2015/0172521 A1 | 6/2015 | Yasukochi et al. |
| 2016/0100082 A1 | 4/2016 | Schack et al. |
| 2017/0339323 A1 | 11/2017 | Drotleff et al. |
| 2019/0005278 A1 | 1/2019 | Sun et al. |
| 2019/0052782 A1 | 2/2019 | Sung et al. |
| 2021/0072621 A1 | 3/2021 | Faridian et al. |

FOREIGN PATENT DOCUMENTS

| | | |
|---|---|---|
| CN | 110082881 A | 8/2019 |
| DE | 102015225794 A1 | 6/2017 |
| DE | 102017123973 A1 | 4/2019 |
| DE | 102017129238 A1 | 6/2019 |
| TW | 201335693 A | 9/2013 |
| WO | 2018054426 A1 | 3/2018 |

\* cited by examiner

METHOD FOR PRODUCING A CAMERA MODULE, CAMERA MODULE

FIELD

The present invention relates to a method for producing a camera module. In addition, the present invention relates to a camera module. The camera module has preferably been produced in accordance with a method according to the present invention.

BACKGROUND INFORMATION

Camera modules of the type mentioned at the outset are used in a multiplicity of different applications. For example, they can be used for environment monitoring in stationary or mobile safety systems, for instance in video-based driver-assistance systems of vehicles. In addition, camera modules of this kind can be used in a very wide range of consumer goods, for example in mobile terminals such as smartphones or tablets. The trend in this regard is toward compact modules having the simplest possible construction.

Main components of a camera module of the type mentioned at the outset are an image sensor and an objective having at least one lens. In general, the image sensor is arranged on a support and is enclosed by a housing for protection against external influences. Before the objective can be connected to the support or the housing, it has to be actively aligned with respect to the image sensor. To then connect the objective to the support or the housing, adhesive or welding processes are generally used, since these simultaneously allow the required tightness to be produced. Adhesive connections, however, have many drawbacks. These include the fact that the material properties of the customary adhesives change as a result of moisture-induced swelling and/or aging, such that, depending on the environmental conditions, a stable focus position of the objective throughout the service life is difficult to achieve. The generally high coefficient of thermal expansion of adhesives has also proven to be disadvantageous. Therefore, a welded connection is generally preferred over an adhesive connection.

For example, U.S. Patent Application Publication No. US 2019/005278 A2 describes a camera module comprising an objective, a lens holder, an image sensor and a printed circuit board. When the camera module is assembled, the objective and the lens holder are aligned with one another and then permanently fixed in place by means of spot welds. The spot welds are executed by means of a laser. It is also provided that a sealing element is arranged between the objective and the lens holder.

To produce a welded connection, there must be no clearances, or only slight clearances, between the joining partners. However, alignment of the objective on multiple axes with respect to the image sensor can lead to comparatively large clearances that no longer allow for a welded connection.

An object of the present invention is to remedy this. In particular, once the objective has been aligned on multiple axes with respect to an image sensor, it should be possible to fix it in position by means of a welded connection, and specifically regardless of the clearance between the respective joining partners. Doing so is intended to achieve a robust connection and a stable focus position.

To achieve the object, a method and a camera module are provided in accordance with the present invention. Advantageous specific embodiments of the present invention are disclosed herein.

SUMMARY

In an example embodiment of a method for producing a camera module in accordance with the present invention, an objective is aligned with respect to an image sensor and then fixed in position by being joined to a support receiving the image sensor, to a housing enclosing the image sensor or to an interposed connecting structure as a joining partner. According to the present invention, the objective is mounted on spacer elements, which are initially still movable, and is aligned with respect to the image sensor by moving the spacer elements. Once the objective has been aligned, the spacer elements are welded to the objective and the joining partner.

By welding the spacer elements to the objective on one side and to the relevant joining partner of the objective on the other side, the spacer elements and the objective are fixed in position. This means that the spacer elements cannot move any further after the welding, and the set focus position of the objective is retained. Since the welded connection is largely immune to temperature and moisture, in particular compared with the adhesive connection, and is thus particularly robust, a particularly stable focus position of the objective is simultaneously achieved.

Before the welding, the spacer elements, which are initially still movable, allow the objective to be aligned on multiple axes, preferably aligned about three translational and two rotational axes, such that precise focusing of the objective is possible. In this respect, it is advantageous that the objective can move largely freely since there is no direct contact between the objective and the joining partner, but rather only indirect contact via the movable spacer elements.

Preferably, spacer elements that each have at least one spherical, partly spherical, cylindrical, or partly cylindrical contact contour are used in the production of the camera module. For example, balls or rolls can be used as spacer elements. In addition, rods having partly spherical or partly cylindrical contact contours merely at their ends can be used as spacer elements. Via contact contours shaped in this manner, punctiform or linear contact is created between a spacer element and a contact surface formed on the objective or on the relevant joining partner. The punctiform or linear contact allows the spacer element to roll on the contact surface, thereby further simplifying the aligning of the objective with respect to the image sensor.

Further preferably, the spacer elements are arranged at the same angular distance from one another around a preferably cylindrical or conically shaped external contour of the objective. Advantageously, the number of spacer elements is three, which enables maximum degrees of freedom of the objective and, at the same time, secure support thereof. By rolling in the punctiform or linear contact regions, the spacer elements can participate in all the movements of the objective required for the aligning. In the process, rod-shaped spacer elements change their tilt angle. If the external contour of the objective is conically shaped, the diameter on which the punctiform or linear contact regions of the spacer elements are positioned changes.

Advantageously, the spacer elements are guided via a guide geometry formed by the support or by the housing. The guidance limits the range of motion of the spacer elements in each region of contact with the support or the housing, such that the spacer elements perform controlled movements. The guide geometry can be formed such that, in particular, lateral guidance of the spacer elements is achieved. For this purpose, the guide geometry preferably has, for each spacer element, two parallel guide surfaces arranged substantially radially in relation to the objective. If the spacer elements contact the guide surfaces, further punctiform or linear contact regions are created. Alternatively or additionally, the guide geometry can form a kind of abutment. In this case, the guide geometry predetermines the maximum diameter on which the punctiform and/or linear regions of contact of the spacer elements with the support or with the housing are positioned. To form an abutment for a spacer element, the guide geometry can, for example, have a guide surface which is oriented substantially tangentially to the objective and on which the spacer element is supported. In this case, there is also punctiform or linear contact of the spacer element with the guide surface that forms the abutment.

Alternatively to a guide geometry formed by the support or by the housing, the spacer elements can also be guided by means of the aforementioned connecting structure, if one is provided. The connecting structure can, for example, be a metal component of the support or, where a circuit board is used as the support, a metal coating of the circuit board. The connecting structure can also be a metal frame arranged on the support or on the housing. The advantage of using a metal connecting structure is that the weldability of the connecting structure is ensured. To guide the spacer elements, the connecting structure can have side walls running in parallel and oriented substantially radially in relation to the objective, and/or walls oriented substantially tangentially to the objective and each forming an abutment for a spacer element.

In accordance with an example embodiment of the present invention, it is also provided that the spacer elements are guided via a shared cage. The guidance via the shared cage can be provided as an alternative to or in addition to a guide geometry or guidance via the connecting structure. The advantage of the guidance by way of the shared cage is that the spacer elements are interconnected. To permit the spacer-element movements that are required for aligning the objective, the cage can be made of a flexible or elastically deformable material at least in some regions. The cage can additionally have at least one joint for permitting a change in the tilt angle of a rod-shaped spacer element.

A camera module, in accordance with an example embodiment of the present invention, comprises an objective and an image sensor, which is arranged on a support and enclosed by a housing. According to the present invention, the objective is mounted on spacer elements, which are integrally bonded to the objective on one side and to the support, to the housing or to an interposed connecting structure on the other side.

In the camera module of the present invention, the objective is accordingly not connected to the relevant joining partner directly, but rather indirectly by way of the spacer elements. The spacer elements bridge a gap between the objective and the relevant joining partner, such that a robust welded connection can be produced regardless of the clearance. Before the welded connection is produced, the spacer elements additionally allow the objective to be aligned with respect to the image sensor, preferably in accordance with the above-described method according to the present invention.

Further preferably, the spacer elements each have at least one spherical, partly spherical, cylindrical or partly cylindrical contact contour. A contact contour of this kind enables rolling on a contact surface, such that, before being welded to the objective and the relevant joining partner, the spacer elements can participate in all the movements required to align the objective.

According to a preferred specific embodiment of the present invention, the spacer elements are arranged at the same angular distance from one another around a preferably cylindrical or conically shaped external contour of the objective. The objective is thus supported evenly over the circumference, thereby promoting a stable focus position of the objective. In this case, the number of spacer elements is preferably three since three spacer elements enable secure support but also the greatest possible degrees of freedom when the objective is being aligned during production of the camera module.

In addition, it is provided that the spacer elements are received, at least in some portions, in a guide geometry and/or in a shared cage. In particular, the guidance of the spacer elements is intended to simplify the aligning of the objective during production of the camera module. In the finished camera module, additional support of the spacer elements can be achieved by way of the guide geometry and/or the cage, thus further increasing the stability of the focus position. Accordingly, the guidance has advantages that are apparent not only during production of the camera module.

In a development of the present invention, it is provided that a sealing element is arranged between the objective and the support, between the objective and the housing or between the objective and the connecting structure. The sealing element is used primarily for shielding the optically relevant region against the ingress of dirt. The image sensor in particular is to be protected against becoming dirty. Ideally, therefore, the sealing element is a sealing ring that allows for all-around shielding or sealing.

The provided camera module according to an example embodiment of the present invention has preferably been produced in accordance with the above-described method according to the present invention, since the method allows the objective to be aligned on multiple axes and guarantees a stable focus position in that the spacer elements are subsequently welded to the objective and the relevant joining partner.

The provided camera module in accordance with an example embodiment of the present invention can also be an imager module. In this respect, no distinction is drawn between a camera module and an imager module.

The support on which the image sensor is arranged is preferably rigidly connected, e.g., screwed, glued, soldered or welded, to the housing or to the lens holder. The support can in particular be a circuit board.

Preferred specific embodiments of the present invention will be explained in more detail below on the basis of the figures.

DETAILED DESCRIPTION OF EXAMPLE EMBODIMENTS

A camera module 1 according to the present invention has spacer elements 7, which allow an objective 2 to be aligned on multiple axes with respect to an image sensor 3. The functioning of these spacer elements 7 will first be explained on the basis of FIGS. 1A-1D.

Figure 1A:
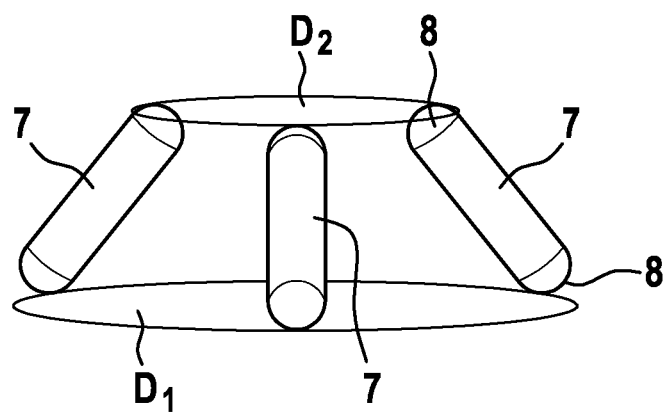
FIGS. 1A to 1D are perspective views of rod-shaped spacer elements for a camera module according to an example embodiment of the present invention in different positions.

FIG. 1A shows three rod-shaped spacer elements 7 having a circular cross section and partly spherical ends, the ends forming contact contours 8. The three spacer elements 7 are placed along a circular line, having a diameter $D_1$, and are each tilted inward such that the upper contact contours 8 rest on a shared circular line having a diameter $D_2$. This circular line denotes the region of contact of the spacer elements 7 with an external contour 9 of the objective 2.

Since the contact contours 8 are each partly spherical, there is in each case punctiform contact of the spacer elements 7 with the external contour 9 of the objective 2 on one side, and with the placement surface on the other side. The partly spherical ends thus form contact contours 8 by means of which the spacer elements 7 can roll on each contact surface. This allows the tilt angles of the spacer elements 7 to be changed in order to align the objective 2 on multiple axes.

Figure 1B:
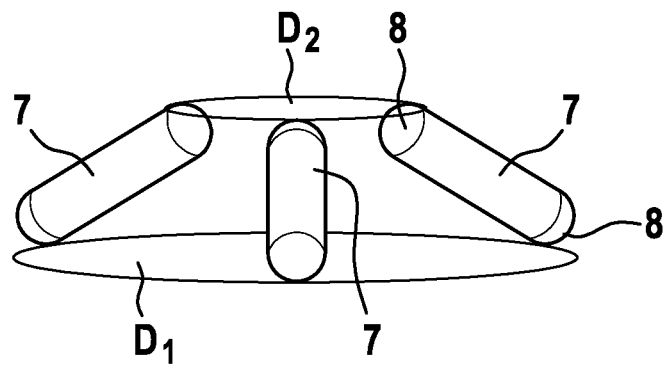

As shown by way of example in FIG. 1B, the tilt angle of the spacer elements 7 can be decreased in order to reduce the distance between the objective 2 and the image sensor 3. Since in the present case the outer limits of the diameter $D_1$ are defined, substantially only the diameter $D_2$ changes.

Figure 1C:
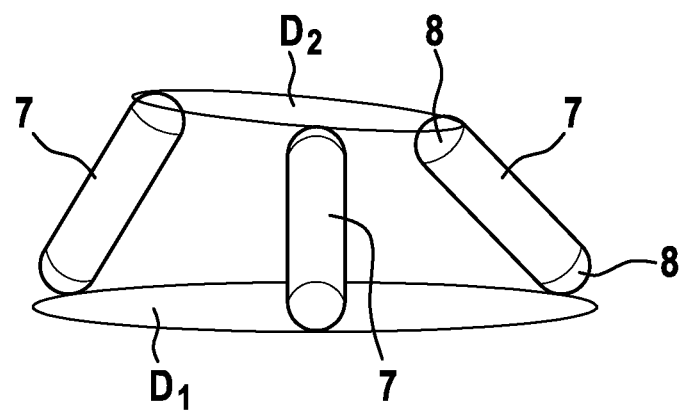
Figure 1D:
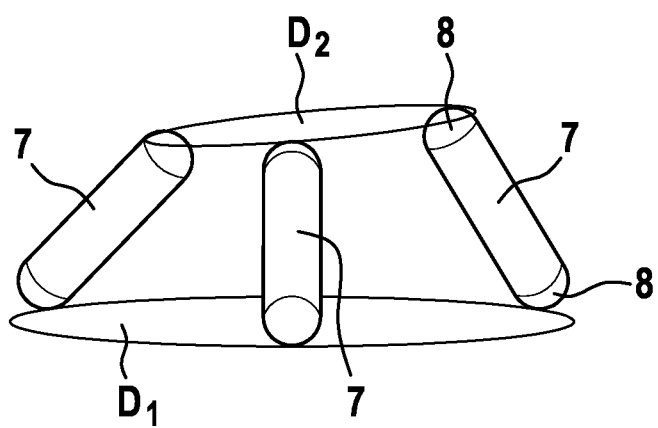

To bring the objective 2 into a slight tipped position, the spacer elements 7 can, as shown by way of example in FIGS. 1C and 1D, also be tilted to different extents. In this case, the spacer elements 7 follow the movement of the objective 2 during aligning.

In FIGS. 1C and 1D, the diameter $D_2$ at the objective 2 does not have an exact circular shape, but rather has an elliptical shape, although this is negligible in the present case.

Figure 2A:
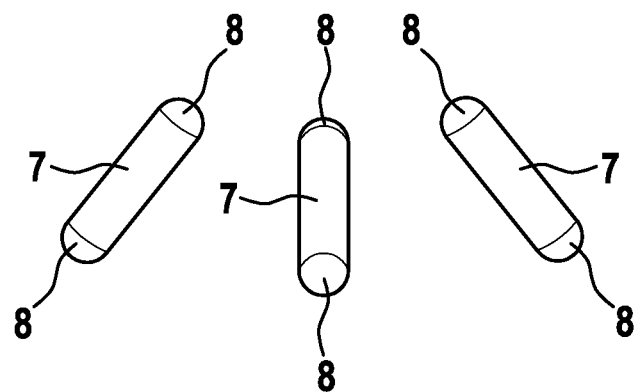
FIGS. 2A to 2D are perspective views of different spacer elements for a camera module according to example embodiments of the present invention.
Figure 2B:
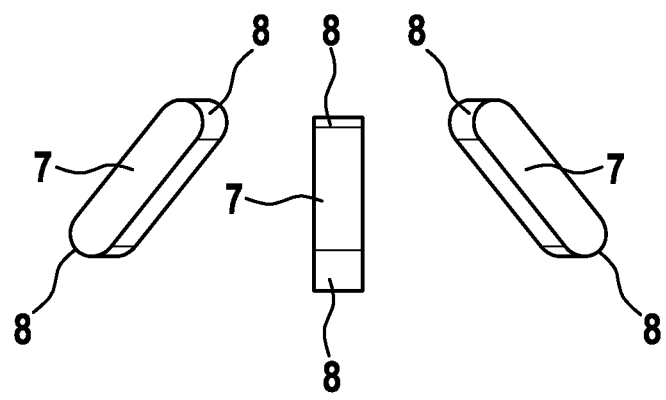
Figure 2C:
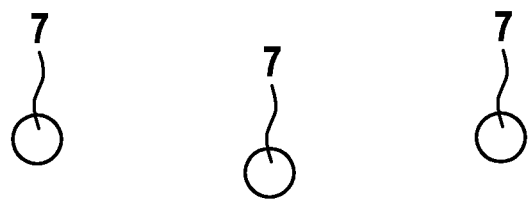
Figure 2D:
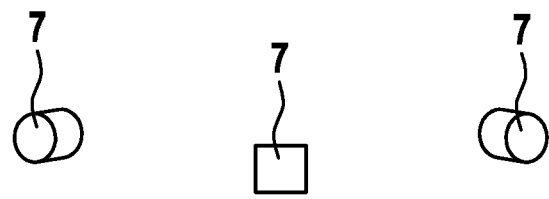

Alternative spacer elements 7 can be seen in FIGS. 2A-2D. FIG. 2A shows the rod-shaped spacer elements 7 from FIGS. 1A-1D having a circular cross section and partly spherical contact contours 8. FIG. 2B shows spacer elements 7 that are likewise rod-shaped but have a rectangular cross section and partly cylindrical contact contours 8. FIG. 2C shows spherical spacer elements 7 and FIG. 2D shows roll-like spacer elements 7. The possible uses of the different spacer elements 7 will be explained in more detail below on the basis of specific exemplary embodiments.

Figure 3A:
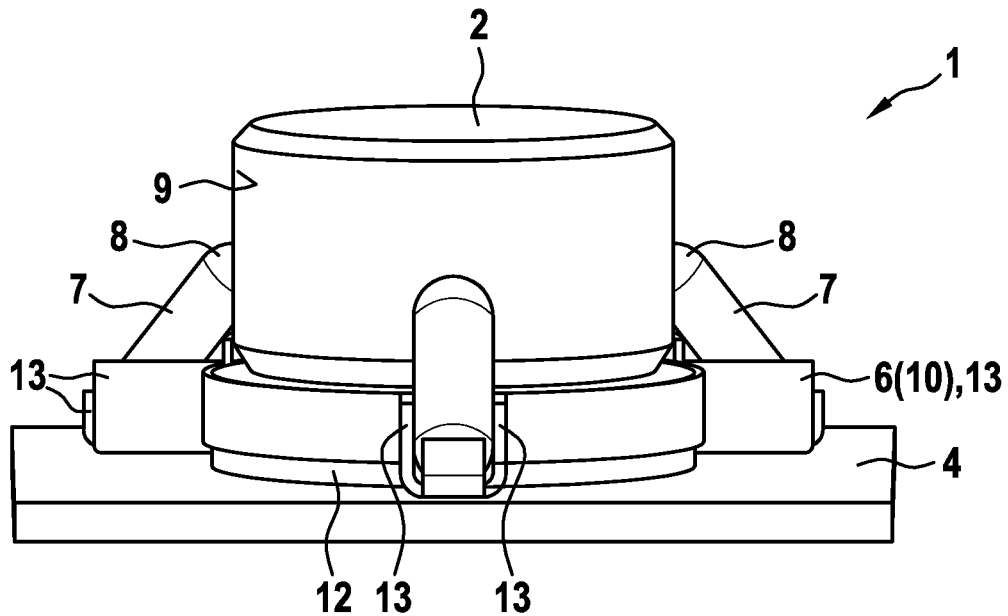
FIG. 3A is a perspective view of a first preferred specific embodiment of a camera module according to the present invention.
Figure 3B:
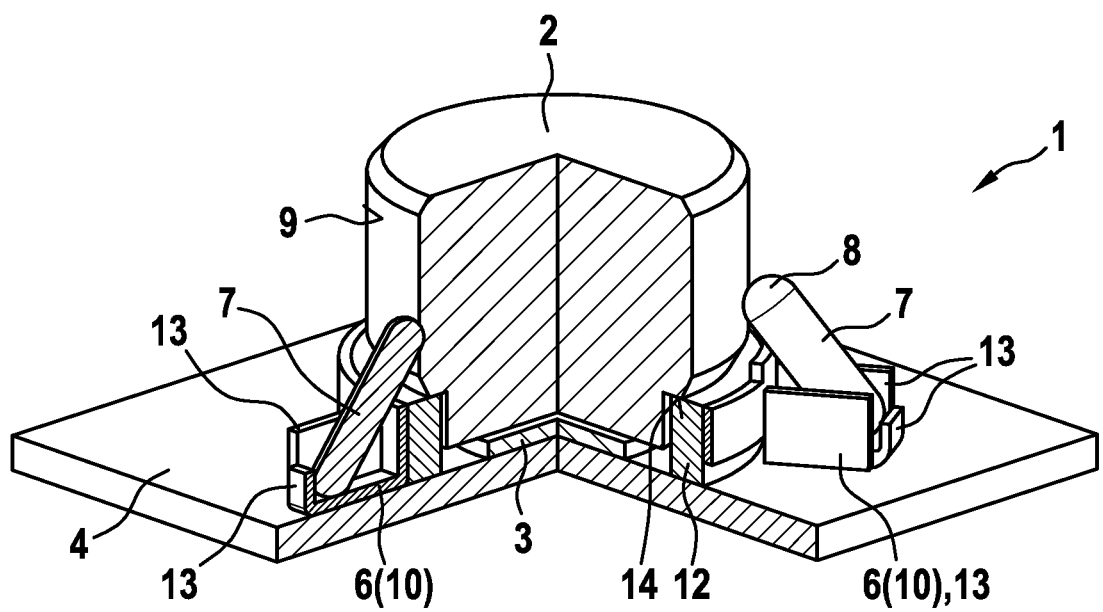
FIG. 3B is a sectional view the example embodiment of FIG. 3A.

FIGS. 3A and 3B show a first camera module 1 according to the present invention, comprising an objective 2 and an image sensor 3. The image sensor 3 is arranged on a support 4, which, in the present case, is a circuit board via which the necessary electrical contacts of the image sensor 3 are produced. The objective 2 is positioned at a distance above the image sensor 3 and is mounted via three rod-shaped spacer elements 7 in accordance with FIG. 1A. Unlike FIG. 1A, the objective 2 is contacted by the spacer elements 7, via their contact contours 8, on its external circumference rather than on its end face. The effect of this is that it is not the diameter $D_2$ that can be changed but rather the diameter $D_1$. If the tilt angle of the spacer elements 7 changes while the objective 2 is being aligned, the diameter $D_1$ changes at the same time.

In FIGS. 3A and 3B, the spacer elements 7 are supported on the support 4 not directly, but rather indirectly via a connecting structure 6 arranged on the support 4. Said connecting structure is made of a metal material, so the spacer elements 7, which are likewise made of a metal material, can be welded to the connecting structure 6 once the objective 2 has been aligned. In this way, the objective 2 is fixed in position. Since the welded connection is particularly robust, a stable focus position of the objective 2 is simultaneously achieved.

In the specific embodiment shown in FIGS. 3A and 3B, the metal connecting structure 6 is simultaneously used as a guide geometry 10, by means of which the spacer elements 7 are guided while the objective 2 is being aligned. For this purpose, the guide geometry 10 has elevated side walls 13, which run in parallel with a radial and in parallel with a tangent to the objective 2. The side walls 13 running in parallel with the tangent form respective abutments for the spacer elements 7, such that the maximum diameter $D_1$ is predetermined.

In the exemplary embodiment shown in FIGS. 3A and 3B, an annular sealing element 12 is additionally arranged between the objective 2 and the support 4. Since said sealing element is made of an elastically deformable material, it can participate in the movements of the objective 2 during aligning. In the present case, the sealing element 12 encloses an end portion of the objective 2, which end portion has a reduced external diameter such as to form an annular shoulder 14, which the sealing element 12 sealingly adjoins.

Figure 4A:
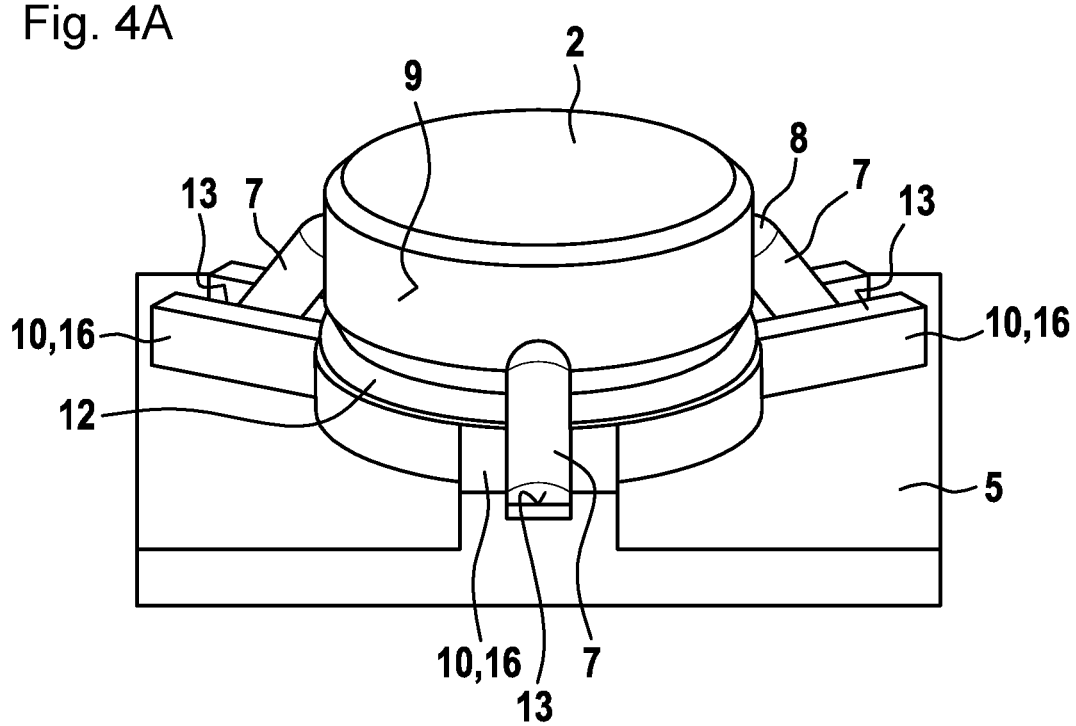
FIG. 4A is a perspective view of a second preferred specific embodiment of a camera module according to the present invention.
Figure 4B:
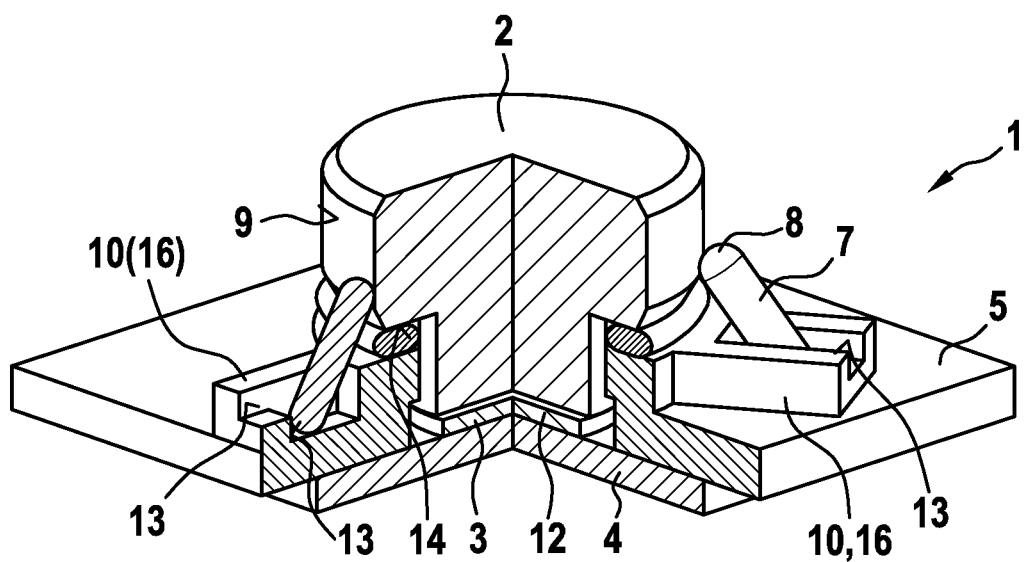
FIG. 4B is a sectional view of the example embodiment of FIG. 4A.

FIGS. 4A and 4B show a second preferred specific embodiment of a camera module 1 according to the present invention. In this case, the objective 2 is supported by way of the spacer elements 7 not on the support 4 but on a housing 5. The support 4 is rigidly connected to the housing 5. The design of the objective 2 and of the spacer elements 7 corresponds substantially to that in FIGS. 3A and 3B. A sealing element 12 between the objective 2 and the housing 5 is likewise provided, the sealing element 12 being arranged on a hollow-cylindrical extension 15 of the housing 5.

Portions 16 of a guide geometry 10 extend radially outward from the hollow-cylindrical extension 15. The guide geometry 10 is thus integrated in the housing 5. The number of portions 16 corresponds to the number of spacer elements 7. Each portion 16 has two side walls 13 running in parallel with a radial, and one side wall 13 running in parallel with a tangent. Said latter side wall forms an abutment such that the diameter $D_1$ is limited outwardly. The diameter $D_2$ is predetermined by the objective 2, since in this case too the spacer elements 7 contact the cylindrical external contour 9 of the objective 2 on the external circumference thereof.

Figure 5A:
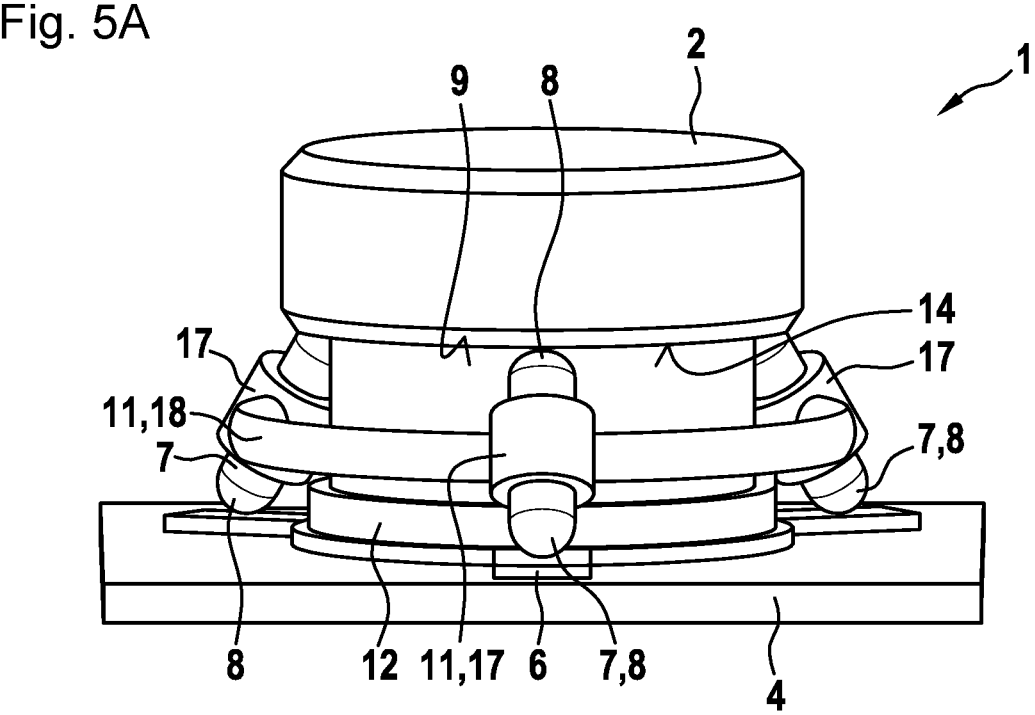
FIG. 5A is a perspective view of a third preferred specific embodiment of a camera module according to the present invention.
Figure 5B:
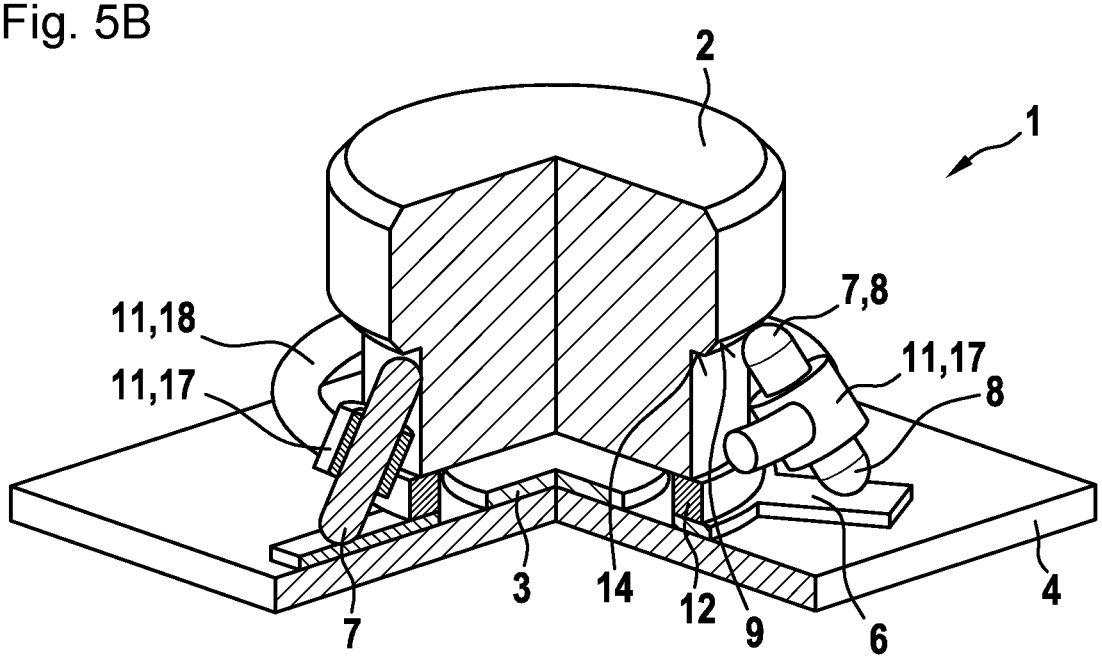
FIG. 5B is a sectional view of the example embodiment of FIG. 5A.

This is different in the camera module 1 shown in FIGS. 5A and 5B. In this case, in the region of the shoulder 14, the objective 2 has a conically shaped external contour 9, which the spacer elements 7 contact. This means that the diameter $D_2$ can be changed depending on the position of the spacer elements 7 on the conical external contour 9 of the objective 2. Since the spacer elements 7 are not guided by means of a guide geometry 10 at the other end either, the diameter $D_1$ can also be changed. At the same time, guidance of the spacer elements 7 is achieved by way of a cage 11 in which the spacer elements 7 are movably mounted. For this purpose, the cage 11 has sleeve-shaped receptacles 17, which are connected by way of a ring 18 and are each rotatably mounted such that the cage 11 allows the tilt angles of the spacer elements 7 to change.

At their base points, the spacer elements 7 are supported on the support 5 indirectly via a metal connecting structure 6. To fix the objective 2 in position, the spacer elements 7 are welded to the connecting structure 6 on one side, and to the external contour 9 of the objective 2 on the other side. In the present case, the sealing element 12 is arranged between the objective 2 and the connecting structure 6.

Figure 6A:
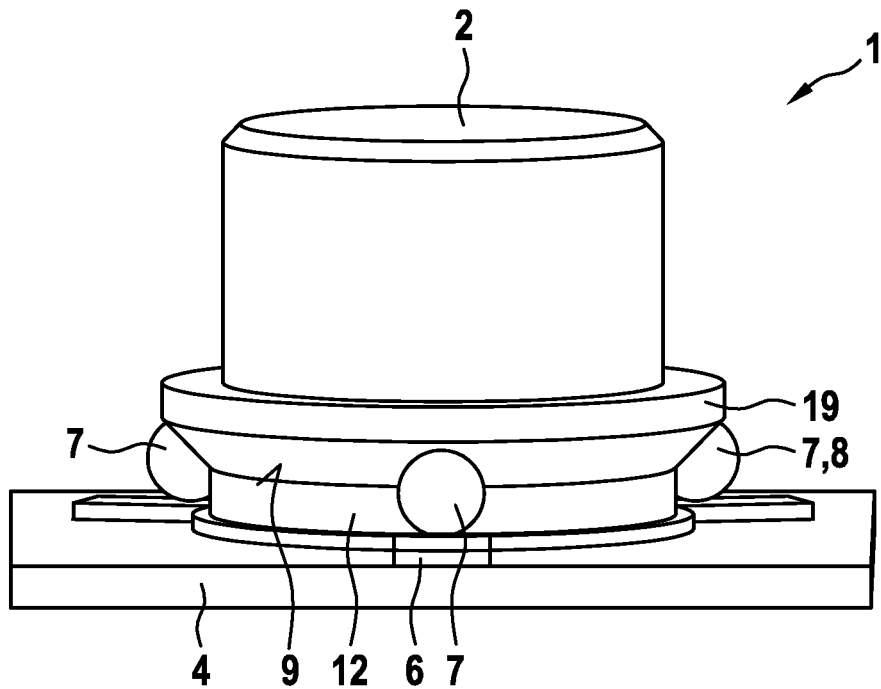
FIG. 6A is a perspective view of a fourth preferred specific embodiment of a camera module according to the present invention.
Figure 6B:
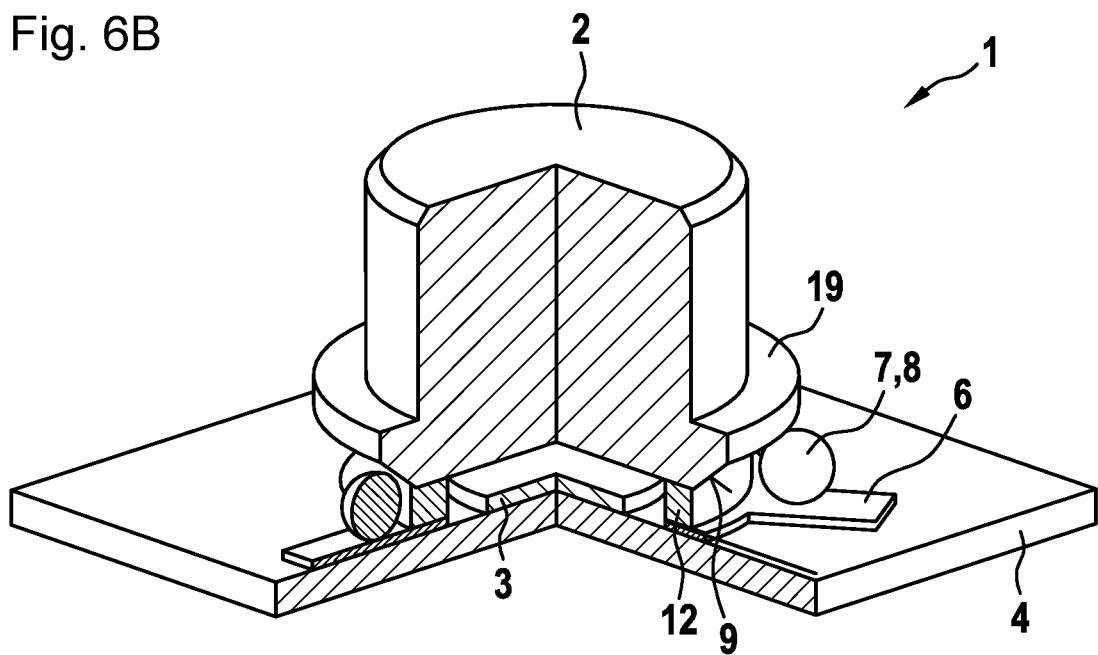
FIG. 6B is a sectional view of the example embodiment of FIG. 6A.

FIGS. 6A and 6B show an additional preferred specific embodiment of a camera module 1 according to the present invention. In this case, the spacer elements 7 are spherical and contact a conically shaped external contour 9 of the objective 2. In the present case, the conically shaped external contour 9 is formed on an annular collar portion 19 of the objective 2. The spherical spacer elements 7 roll on a metal connecting structure 6, which is arranged on a support 4 and allows the spacer elements 7 to be welded once the objective 2 has been aligned. The sealing element 12 is arranged between the objective 2 and the connecting structure 6.

Figure 7A:
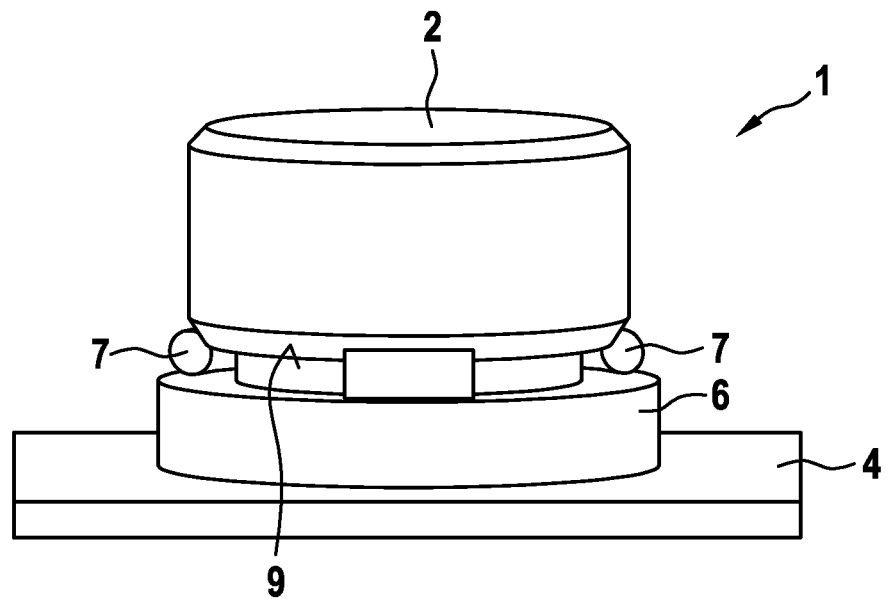
FIG. 7A is a perspective view of a fifth preferred specific embodiment of a camera module according to the present invention.
Figure 7B:
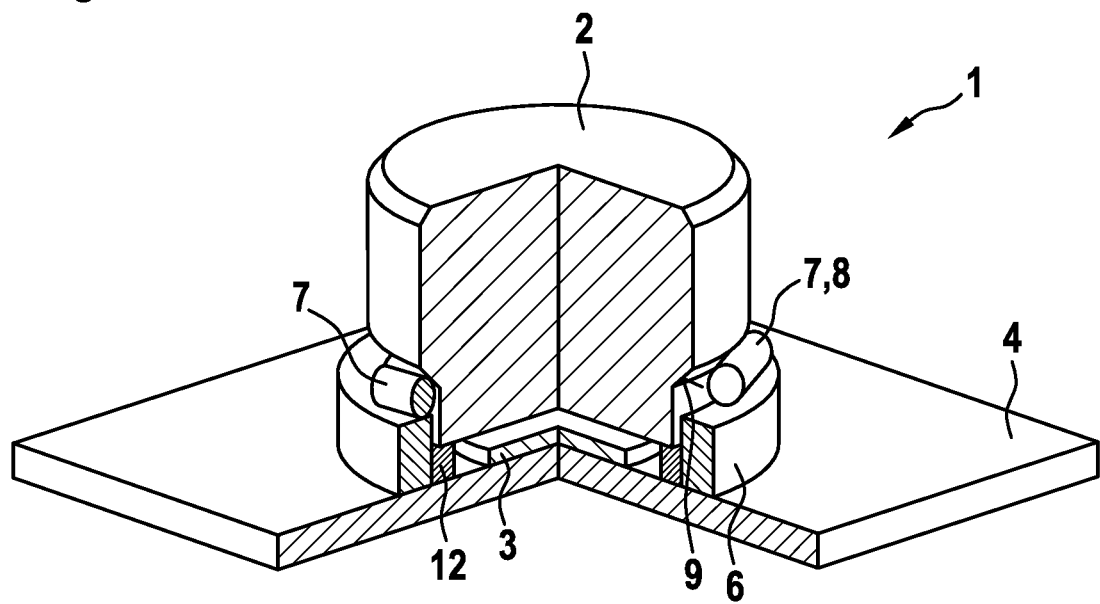
FIG. 7B is a sectional view of the embodiment of FIG. 7A.

Instead of spherical spacer elements 7, roll-like spacer elements 7 can also be used. A corresponding specific embodiment is shown in FIGS. 7A and 7B. The objective 2 is configured similarly to FIGS. 6A and 6B, such that the rolls contact a conically shaped external contour 9 of the objective 2. Facing the external contour 9 of the objective 2 is a metal connecting structure 6, which is arranged on the support 4. The connecting structure 6 is formed as a ring, on which the roll-like spacer elements 7 roll when the objective 2 is being aligned. After the alignment, the spacer elements 7 are welded to the connecting structure 6. The sealing element 12 is arranged between the objective 2 and the support 4.

In addition to the exemplary embodiments shown, a multiplicity of further specific embodiments are possible which reflect the fundamental concept of the present invention. Generally speaking, spacer elements 7 that are spherical or roll-like in accordance with FIGS. 6A, 6B, 7A and 7B require a conically shaped contact surface in order to be able to follow the movements of the objective 2 during aligning. The conically shaped contact surface can be formed either by the external contour 9 of the objective 2 or by a conically shaped contact surface of the housing 5, of the support 4 or of the connecting structure 6. In the case of rod-shaped spacer elements 7, the external contour 9 of the objective 2 can also be cylindrical since rod-shaped spacer elements 7 can change their tilt angle if at least one diameter $D_1$ and/or $D_2$ is variable.

What is claimed is:

1. A method for producing a camera module, the method comprising:
    mounting an objective on spacer elements, which are initially still movable;
    aligning the objective with respect to an image sensor by moving the spacer elements, wherein the objective is aligned and then fixed in position by being joined to a support receiving the image sensor or to a housing enclosing the image sensor or to an interposed connecting structure, as a joining partner; and
    welding, once the objective has been aligned, the spacer elements to the objective and the joining partner;
    wherein the spacer elements are not flat and are positioned outside of the objective.

2. The method as recited in claim 1, wherein the spacer elements each have at least one spherical or partly spherical or cylindrical or partly cylindrical, contact contour.

3. The method as recited in claim 1, wherein the spacer elements are arranged at the same angular distance from one another around a conically shaped external contour of the objective.

4. The method as recited in claim 1, wherein the spacer elements are guided via a guide geometry, which is formed by the support or the housing, or via the connecting structure.

5. The method as recited in claim 1, wherein the spacer elements are guided via a shared cage.

6. A camera module, comprising:
    an objective; and
    an image sensor arranged on a support and enclosed by a housing;
    wherein the objective is mounted on spacer elements, which are welded to the objective on one side, and wherein the spacer elements are welded to the support, or to the housing, or to an interposed connecting structure on another side of the objective;
    wherein the spacer elements are not flat and are positioned outside of the objective.

7. The camera module as recited in claim 6, wherein the spacer elements each have at least one spherical or partly spherical or cylindrical or partly cylindrical, contact contour.

8. The camera module as recited in claim 6, wherein the spacer elements are arranged at the same angular distance from one another around a conically shaped external contour of the objective.

9. The camera module as recited in claim 6, wherein the spacer elements are received, at least in some portions, in a guide geometry and/or in a shared cage.

10. The camera module as recited in claim 6, wherein a sealing element is arranged between the objective and the support or between the objective and the housing or between the objective and the connecting structure.

11. The camera module as recited in claim 10, wherein the sealing element is a sealing ring.

12. A method for producing a camera module, the method comprising:
    mounting an objective on spacer elements, which are initially still movable;
    aligning the objective with respect to an image sensor by moving the spacer elements; and
    welding, once the objective has been aligned, the spacer elements to the objective, and to a support or a housing or an interposed connecting structure;

wherein the camera module includes:
  the objective; and
  the image sensor arranged on the support and enclosed by the housing;
  wherein the objective is mounted on the spacer elements, which are welded to the objective on one side, and to the support, or to the housing, or to the interposed connecting structure on another side of the objective;
  wherein the spacer elements are not flat and are positioned outside of the objective.

* * * * *